(12) United States Patent
Svihla et al.

(10) Patent No.: US 6,896,479 B2
(45) Date of Patent: May 24, 2005

(54) TURBOCHARGER ROTOR

(75) Inventors: Gary R. Svihla, Chicago, IL (US); Eric J. Duve, Riverside, IL (US); John M. Carr, Chicago, IL (US)

(73) Assignee: General Motors Corporation, Detroit, MI (US)

( * ) Notice: Subject to any disclaimer, the term of this patent is extended or adjusted under 35 U.S.C. 154(b) by 230 days.

(21) Appl. No.: 10/409,514

(22) Filed: Apr. 8, 2003

(65) Prior Publication Data

US 2004/0202556 A1 Oct. 14, 2004

(51) Int. Cl.$^7$ ................................................. F01D 3/00
(52) U.S. Cl. .................... 415/104; 415/216.1; 415/229; 416/244 R
(58) Field of Search ................................. 415/104, 107, 415/229, 216.1; 416/244 R

(56) References Cited

U.S. PATENT DOCUMENTS 3,043,636 A * 7/1962 Macinnes et al. ........... 384/287
6,499,884 B1 * 12/2002 Svihla et al. ............... 384/138

* cited by examiner

*Primary Examiner*—Ninh H. Nguyen
(74) *Attorney, Agent, or Firm*—Cary W. Brooks

(57) ABSTRACT

A turbocharger rotor has a turbine wheel and shaft, a compressor wheel and adapter and a separate thrust runner clamped together by a fastener rod. The adapter is piloted on the shaft and the thrust runner is piloted on the adapter, which has annular ends engaging the shaft and adapter for torque transmission between the turbine and compressor wheels. An anti-rotation coupling relates the phase angles of the shaft with the adapter and the thrust runner during assembly. Opposed radial thrust faces on the thrust runner and adapter are disposed at opposite ends of a compressor bearing journal on the adapter to allow placement of mating bearings on a single element of a turbocharger housing. Advantages include simplification of manufacture and assembly of the rotor in a turbocharger housing.

10 Claims, 2 Drawing Sheets

TURBOCHARGER ROTOR

TECHNICAL FIELD

This invention relates to engine exhaust driven turbochargers and, more particularly, to a rotor including turbine and compressor wheels joined by associated components.

BACKGROUND OF THE INVENTION

It is known in the art relating to exhaust driven engine turbochargers to provide a rotor including a turbine wheel and a compressor wheel connected by a shaft for rotation together about an axis. In some cases, the shaft is formed as an extension of the turbine wheel. Separate shaft and wheel components may be welded together before final machining. Alternatively, a steel shaft may be connected to the turbine and to the compressor wheel by separate connecting means. Commonly, the impeller or compressor wheel is made of aluminum alloy to minimize the rotating mass.

Various types of connecting means have been provided for aligning and connecting the wheels and the shaft for axial rotation. Where the connecting means extend through the compressor wheel and clamp the wheel in compression against the shaft, the design should avoid excessive variations in clamping load due to differential thermal growth and the effects of centrifugal force on the steel and aluminum during varying operating and stationary conditions.

The means for connecting the compressor impeller wheel and the turbine wheel to the shaft are also important because the rotor must be disassembled after balancing in order to assemble the rotor into the turbocharger. Upon reassembly of the rotor, the repeat balance must preserve the original balance as far as possible without actually rebalancing the rotor in the turbocharger assembly. A design of turbocharger rotor which meets these requirements is disclosed in U.S. Pat. No. 6,364,634, issued Apr. 2, 2002 to the assignee of the present invention.

SUMMARY OF THE INVENTION

The present invention provides a turbocharger rotor including a turbine wheel and a compressor wheel connected by a shaft and other components for rotation together about an axis. The rotor is intended for use in a turbocharger which is generally similar to that disclosed in the previously noted U.S. Pat. No. 6,364,634 and includes several features similar to those of the rotor disclosed in that patent. However, the present invention also includes additional features intended to make the rotor construction and assembly more efficient.

Thus, the rotor is provided with a separate shaft which is press fitted or otherwise fixed to the turbine and provides a turbine bearing journal adjacent the turbine wheel. A separate adapter is also provided which is press fitted to the compressor wheel and includes a compressor bearing journal adjacent the compressor wheel.

The turbine shaft has an inner end which is piloted within the bearing journal portion of the compressor adapter. An anti-rotation coupling of any suitable type, such as the polygon arrangement of the previous patented embodiment, is provided to maintain the angular relationship of the turbine shaft with the compressor adapter.

A thrust runner includes axially opposite ends which engage mating surfaces of the turbine shaft and compressor adapter. The runner includes a radial flange and is driveably connected with the anti-rotation coupling of the turbine shaft for maintaining alignment of the separable components of the rotor. A tube-like extension of the runner inner portion is piloted on an extension of the compressor adapter.

Oppositely facing radial surfaces of the runner and the adapter form opposed thrust faces that transmit primary and secondary oppositely directed aerodynamic thrust forces to thrust bearings mounted on a portion of an associated turbocharger housing. The thrust faces are located near opposite ends of the adapter bearing journal.

These and other features and advantages of the invention will be more fully understood from the following description of certain specific embodiments of the invention taken together with the accompanying drawings.

DESCRIPTION OF THE PREFERRED EMBODIMENT

Figure 1:
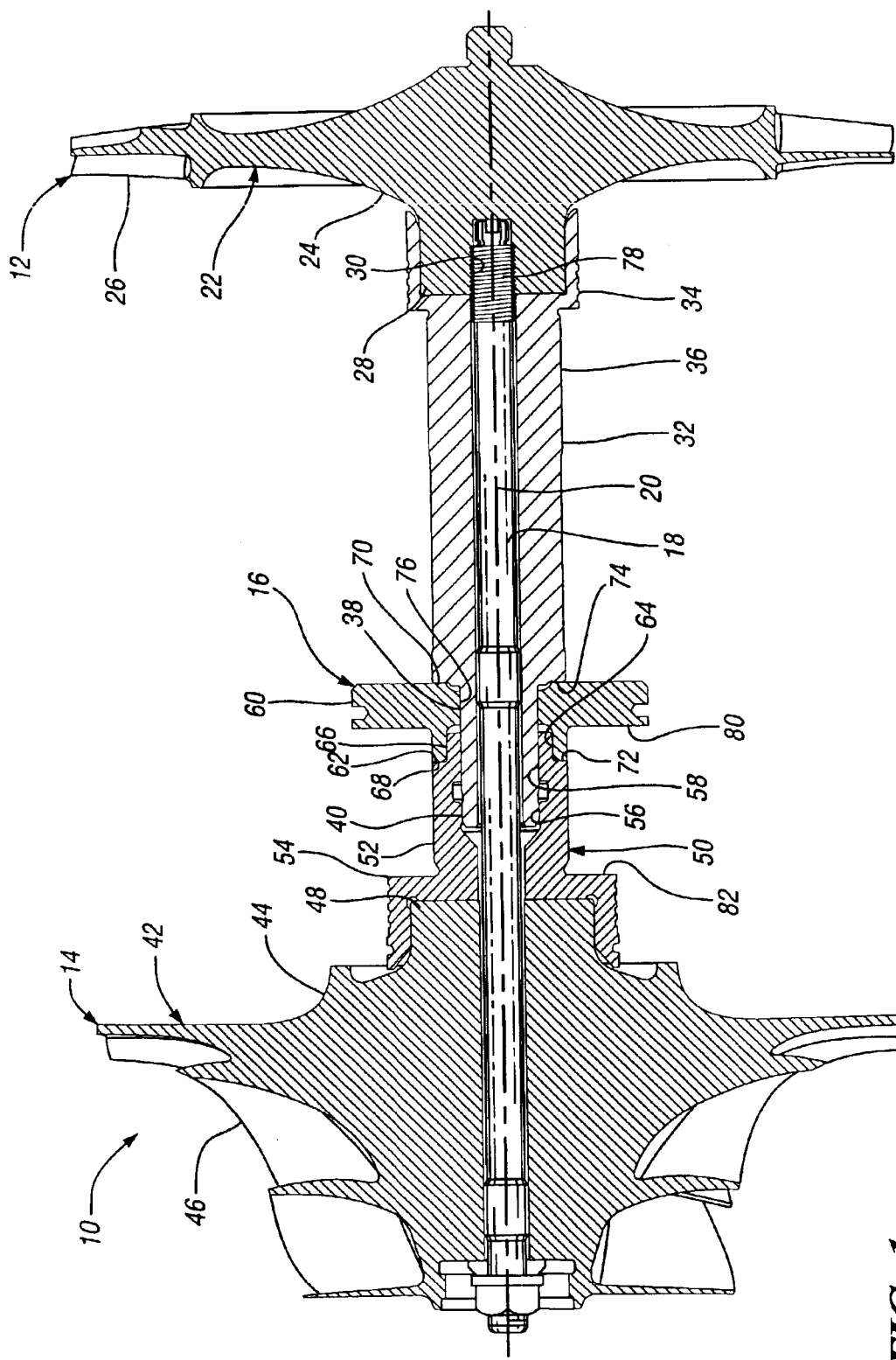
FIG. 1 is a longitudinal cross-sectional view illustrating a turbocharger rotor in accordance with the present invention.
Figure 2:
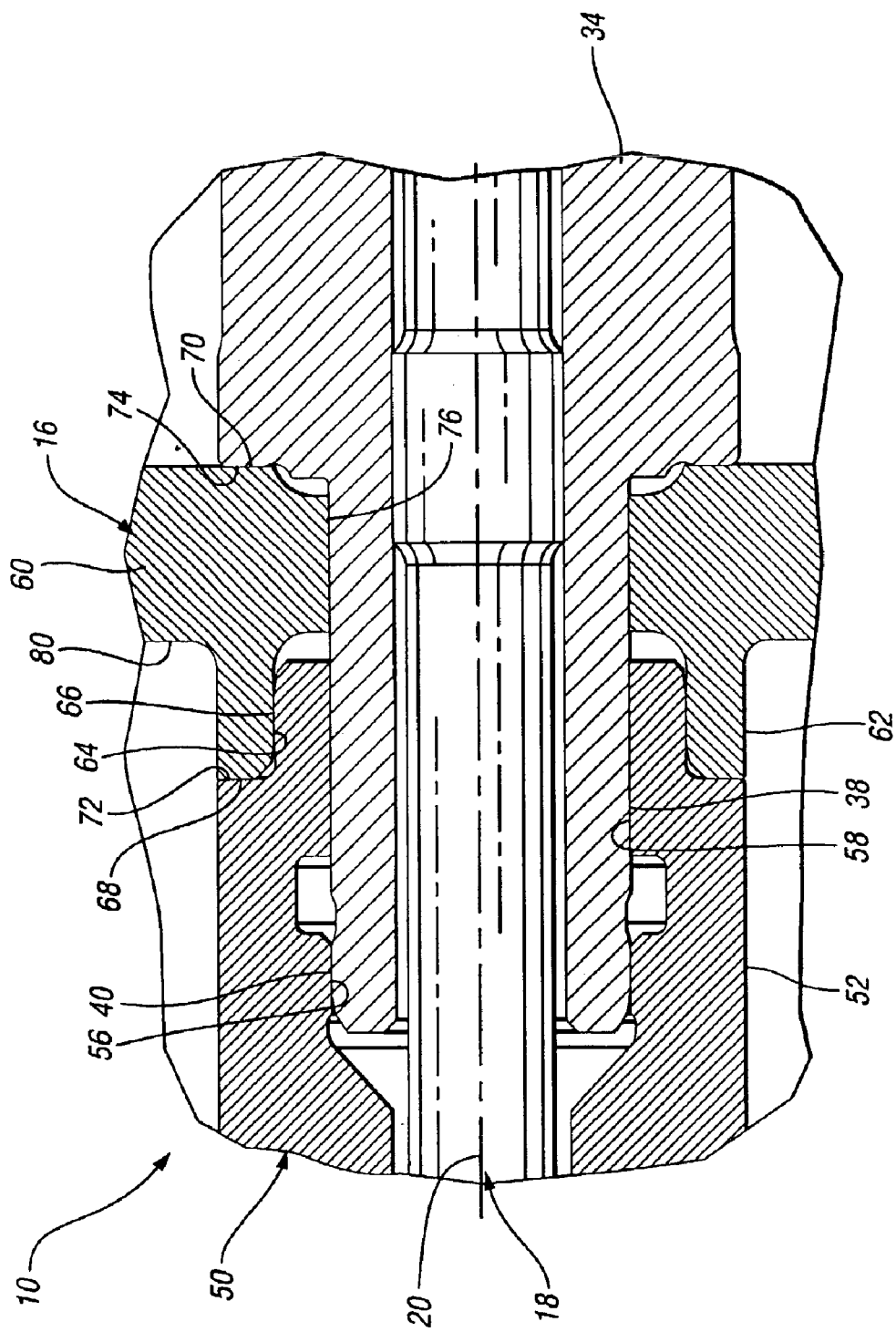
FIG. 2 is an enlarged cross-sectional view of the connecting and piloting portions of the joint between the turbine shaft, the thrust runner and the compressor adapter.

Referring now to the drawings in detail, numeral 10 generally indicates a rotor for an engine turbocharger of the general type shown in the noted U.S. Pat. No. 6,364,634 but modified to accommodate improvements in the rotor structure. Rotor 10 includes a turbine wheel assembly 12, a compressor wheel assembly 14, a separate thrust runner 16 and a fastener rod 18 which extends through the compressor wheel assembly and thrust runner and engages the turbine wheel assembly to clamp the components of the rotor together in axial alignment on a rotational axis 20.

The turbine wheel assembly 12 includes a turbine wheel 22 having a disk like body 24 with exhaust gas reacting turbine blades 26 around the periphery of the body. A mounting stub 28 extends axially inward from the body and includes a threaded recess 30 centered on the axis 20 and opening through the inner end of the stub. A steel driveshaft 32 extends axially from the turbine wheel and includes a cup-like end fitting 34 which is press fitted or otherwise fixed to the mounting stub 28 of the turbine wheel to form the turbine wheel assembly 14. The end fitting 34 is machined on the outer diameter to cooperate with an external seal, not shown. The shaft portion inwardly adjacent the end fitting forms a turbine bearing journal 36 for supporting the turbine end of the rotor 10.

The inner end of the driveshaft 32 includes an external anti-rotation coupling portion 38, which may be of any suitable type but which preferably takes the form of a three sided polygon coupling of known form, which is illustrated, for example, in the previous U.S. Pat. No. 6,364,634. At the end of the shaft 32, beyond the coupling portion 38, a generally cylindrical external pilot 40 is formed.

The compressor wheel assembly 14 includes a compressor wheel 42, preferably made of a suitable aluminum alloy. The compressor wheel includes a body 44 carrying impeller vanes 46 and an inwardly extending mounting stub 48. A separate adapter 50 includes an axially extending compressor bearing journal 52 connected with a cup-shaped end fitting 54 which is press fitted or otherwise fixed to the compressor wheel stub 48, thus forming the compressor wheel assembly 14. The end fitting 54 is also machined on the outer diameter to cooperate with an external seal, not shown.

Within the compressor bearing journal 52, the adapter 50 includes an axial recess having a generally cylindrical internal pilot 56, which is engaged by the pilot 40 of the driveshaft 32. Axially inward of the pilot 56, the adapter 50 includes an internal anti-rotation coupling portion 58, which engages the anti-rotation portion 38 of the driveshaft to assist assembly of these components with predetermined phase angle relationships.

The thrust runner 16 includes a radial flange 60 connected with a smaller diameter axial hub or tubular extension 62 having an internal pilot 64. The pilot 64 engages an external pilot 66 at the inner end of the adapter 50 to maintain the adapter and the thrust runner concentric around the rotational axis 20 of the rotor. The thrust runner further includes opposite end faces 68, 70, which are clamped against mating end faces 72, 74 of the adapter 50 and driveshaft 32 of the rotor.

Internally, the thrust runner also includes an internal anti-rotation coupling portion 76, which is fitted over the external coupling portion 38 of the driveshaft. The coupling portions maintain a predetermined angular relation between the thrust runner 16 and the other components of the rotor during assembly or re-assembly of the rotor after balancing and during assembly in a turbine housing, not shown.

The components of the rotor are clamped together in assembly by the fastener rod 18. The rod 18 extends through axial openings in the compressor wheel 42, the adapter 50, and driveshaft 32. The fastener rod includes a threaded end 78 which is threaded into the threaded recess 30 in the stub of the turbine wheel 22. Tightening of the fastener rod in the threaded recess 30 clamps the thrust runner 16 between the adapter of the compressor wheel assembly 14 and the driveshaft of the turbine wheel assembly 12, causing the rotor components to maintain axial alignment. At the same time, the fitting of the anti-rotation portion 38 of the driveshaft into the mating portions 58, 76 of the adapter and thrust runner, maintains these components in predetermined phase angle alignment so that balancing of the rotor is maintained intact when the rotor is disassembled, after balancing, for installation in the turbocharger housing, not shown, and re-assembly within the housing.

An additional feature of the assembly is that the thrust runner flange 60 includes a radial thrust face 80 which faces toward the compressor wheel while the adapter 50 has, on the end fitting 54, a radial thrust face 82 which faces toward the thrust runner 16 and the turbine wheel 22. The larger radial face 80 of the thrust runner 16 is positioned to transmit the primary aerodynamic thrust forces of the turbine and compressor wheel to a thrust bearing, not shown, mounted in the turbocharger housing. The smaller radial face 82 of the adapter 50 is positioned to transmit secondary aerodynamic thrust forces (reverse forces) from the turbocharger rotor to a secondary thrust bearing, not shown, mounted in the turbocharger housing.

The thrust faces 80, 82 are located adjacent and on opposite sides of the compressor bearing journal 52 formed on the adapter. The arrangement is such that the associated turbocharger housing may carry a compressor journal bearing as well as the two thrust bearings on a single radial member so that the manufacture and assembly of the turbocharger housing, not shown, and the accompanying rotor of the invention are simplified and the tolerances of the various bearing components are more easily maintained.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A rotor for an engine turbocharger, the rotor including a turbine wheel, a compressor wheel, and additional rotor components comprising:

a shaft rotatable with and extending along a rotor axis from one wheel toward the other wheel;

an adapter rotatable with and extending along the axis from the other wheel to the shaft, the adapter including a first radial thrust face axially facing the one wheel;

at least one pilot axially aligning the shaft and the adapter with the axis;

a thrust runner piloted on at least one of the shaft and the adapter and having ends axially engaging the shaft and the adapter, the runner including a flange having a second radial thrust face axially facing the first radial thrust face; and a fastener rod extending axially through at least the adapter and the thrust runner and clamping the thrust runner between the shaft and the adapter to fix the axial alignment of the rotor components and the axial positions of the thrust faces.

2. A rotor for an engine turbocharger, the rotor including a turbine wheel, a compressor wheel, and additional rotor components comprising:

a shaft rotatable with and extending along a rotor axis from the turbine wheel toward the compressor wheel;

an adapter rotatable with and extending along the axis from the compressor wheel to the shaft, the adapter including a first radial thrust face axially facing the turbine wheel for carrying secondary aerodynamic thrust forces;

at least one pilot axially aligning the shaft and the adapter with the axis;

a thrust runner piloted on at least one of the shaft and the adapter and having ends axially engaging the shaft and the adapter, the runner including a flange having a second radial thrust face axially facing the first radial thrust face for carrying primary aerodynamic thrust forces; and a fastener rod extending axially through at least the adapter and the thrust runner and clamping the thrust runner between the shaft and the adapter to fix the axial alignment of the rotor components and the axial positions of the thrust faces.

3. A rotor as in claim 2 wherein the shaft is a separate component fixed on a stub of the turbine wheel to form a turbine/shaft assembly.

4. A rotor as in claim 2 wherein the adapter is a separate component fixed on a stub of the compressor wheel to form a compressor/adapter assembly.

5. A rotor as in claim 2 wherein the shaft has an external pilot end pressed into an internal pilot of the adapter for axial alignment of the turbine/shaft and compressor/adapter assemblies.

6. A rotor as in claim 5 wherein the shaft and the adapter are angularly coupled by an anti-rotation coupling adjacent the external and internal pilots.

7. A rotor as in claim 2 wherein the thrust runner is also angularly coupled to the shaft and adapter by the anti-rotation coupling.

8. A rotor as in claim 2 including a compressor bearing journal on the adapter and spaced axially between the first and second thrust faces on tha adapter and thrust runner.

9. A rotor as in claim 8 including a turbine bearing journal on the shaft adjacent the turbine wheel.

10. A rotor as in claim 2 wherein the fastener rod also extends through the shaft and is fastened to the turbine wheel and includes means for engaging the compressor wheel to maintain the rotor components in compressive engagement.

* * * * *